United States Patent
Hatase et al.

(10) Patent No.: US 6,572,452 B2
(45) Date of Patent: Jun. 3, 2003

(54) DISC FOR TOROIDAL TYPE CONTINUOUSLY VARIABLE TRANSMISSION AND WORKING METHOD THEREFOR

(75) Inventors: Seiichiro Hatase, Hanyu (JP); Masami Tanaka, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/781,223

(22) Filed: Feb. 13, 2001

(65) Prior Publication Data

US 2001/0014639 A1 Aug. 16, 2001

(30) Foreign Application Priority Data

Feb. 16, 2000 (JP) ......................... 2000-037655

(51) Int. Cl.[7] ................................. B24B 1/00
(52) U.S. Cl. ............................ 451/51; 451/52; 451/63
(58) Field of Search ............................ 451/51, 52, 63, 451/406, 408

(56) References Cited

U.S. PATENT DOCUMENTS

| 371,062 A | * | 10/1887 | Hayes | 451/408 |
|---|---|---|---|---|
| 2,791,872 A | * | 5/1957 | Wineka | 451/408 |
| 2,863,263 A | * | 12/1958 | Perkes et al. | 451/408 |
| 3,854,252 A | * | 12/1974 | Lindsay et al. | 451/242 |
| 5,373,666 A | * | 12/1994 | Quintilio | 125/11.01 |
| 5,391,126 A | * | 2/1995 | Fukushima et al. | 384/614 |
| 5,527,210 A | * | 6/1996 | Sharer | 451/246 |
| 5,748,482 A | * | 5/1998 | Nishimura | 451/42 |
| 5,766,059 A | * | 6/1998 | Imai et al. | 451/242 |
| 6,347,980 B1 | * | 2/2002 | Kamamura et al. | 451/161 |
| 6,383,113 B1 | * | 5/2002 | Doppling et al. | 476/40 |
| 2002/0013123 A1 | * | 1/2002 | Kamamura et al. | 451/53 |

FOREIGN PATENT DOCUMENTS

| JP | 1-229158 | 9/1989 |
|---|---|---|
| JP | 4-69439 | 3/1992 |
| JP | 8-252770 | 10/1996 |
| JP | 9-137854 | 5/1997 |
| JP | 11-141637 | 5/1999 |
| JP | 2000-24899 | 1/2000 |

* cited by examiner

Primary Examiner—M. Rachuba
(74) Attorney, Agent, or Firm—Miles & Stockbridge P.C.

(57) ABSTRACT

An inner surface 16a of a torque transmitting disc of a toroidal type continuously variable transmission can be finish-worked without also enhancing accuracy of a cylindrical surface as an outer peripheral surface of the disc. The inner surface is finish-worked with super finish while urging a working surface of a grindstone against the inner surface. In this case, roller shoes are rollingly contacted with the inner surface to prevent the disc from being radially displaced under force from the working surface.

8 Claims, 7 Drawing Sheets

DISC FOR TOROIDAL TYPE CONTINUOUSLY VARIABLE TRANSMISSION AND WORKING METHOD THEREFOR

BACKGROUND OF THE INVENTION

1. Field of the Invention

The present invention relates to an improvement in input and output discs for a toroidal type continuously variable transmission used as a transmitting unit of a transmission of an automobile or transmissions for various industrial machines, and a method for manufacturing or working such discs.

2. Related Background Art

Use of various toroidal type continuously variable transmissions as shown in FIGS. 5 and 6 as transmission for automobiles has been investigated. In such a toroidal type continuously variable transmission, for example, as disclosed in Japanese Patent Application Laid-Open No. 11-141637 (1999), an input disc 2 is supported coaxially with an input shaft 1, and an output disc 4 is secured to an end of an output shaft 3 disposed coaxially with the input shaft 1. Within a casing containing the toroidal type continuously variable transmission, there are provided trunnions 6 rocked around pivot shafts 5 arranged at twisted positions with respect to the input shaft 1 and the output shaft 3.

The trunnions 6 are provided at their outer surfaces with the pivot shafts 5 at both ends thereof. Further, the trunnions 6 support proximal ends of displacement shafts 7 at their centers so that inclination angles of the displacement shafts 7 can be adjusted by rocking the trunnions 6 around the pivot shafts 5. Around the displacement shafts supported by the trunnions 6, power rollers 8 are rotatably supported. The power rollers 8 are pinched between the input disc 2 and the output disc 4. Opposed inner surfaces 2a, 4a of the input and output discs 2, 4 have concave surfaces obtained by rotating an arc or a similar curved line around the input and output shafts 1, 3 respectively. Peripheral surfaces 8a of the power rollers 8 formed as spherical convex surfaces abut against the inner surfaces 2a, 4a.

Between the input shaft 1 and the input disc 2, there is provided an urging device 9 such as a loading cam which serves to elastically bias the input disc 2 toward the output disc 4. The urging device 9 comprises a cam plate 10 rotated together with the input shaft 1, and a plurality (for example, four) of rollers 12 held by a holder 11. One surface (left surface in FIGS. 5 and 6) of the cam plate 10 has a cam surface 13 as a circumferential uneven surface, and an outer surface (right surface in FIGS. 5 and 6) of the input disc 2 has a similar cam surface 14. The plurality of rollers 12 are supported for rotation around axes radially to the center of the input shaft 1.

In use of the toroidal type continuously variable transmission having the above-mentioned construction, when the cam plate 10 is rotated as the input shaft 1 is rotated, the plurality of rollers 12 are urged against the cam surface 14 provided on the outer surface of the input disc 2 by means of the cam surface 13. As a result, the input disc 2 is urged against the plurality of power rollers 8, and, at the same time, the input disc 2 is rotated due to the engagement between the cam surfaces 13, 14 and the plurality of rollers 12. The rotation of the input disc 2 is transmitted to the output disc 4 via the plurality of power rollers 8, thereby rotating the output shaft 3 secured to the output disc 4.

In a case where a rotational speed ratio (transmission ratio) between the input shaft 1 and the output shaft 3 is changed, first of all, when speed reduction is achieved between the input shaft 1 and the output shaft 3, by rocking the trunnions 6 around the pivot shafts 5, as shown in FIG. 5, the displacement shafts 7 are inclined so that the peripheral surfaces 8a of the power rollers 8 abut against a portion near the center on the inner surface 2a of the input disc 2 and a portion near the periphery on the inner surface 4a of the output disc 4, respectively. On the other hand, when speed increase is achieved, by rocking the trunnions 6 around the pivot shafts 5, as shown in FIG. 6, the displacement shafts 7 are inclined so that the peripheral surfaces 8a of the power rollers 8 abut against a portion near the periphery on the inner surface 2a of the input disc 2 and a portion near the center on the inner surface 4a of the output disc 4, respectively. If the inclination angles of the displacement shafts 7 are selected to have middle values between FIG. 5 and FIG. 6, a middle transmission ratio can be obtained between the input shaft 1 and the output shaft 3.

Fundamental structure and function of the toroidal type continuously variable transmission are as mentioned above, and a more concrete construction of such a toroidal type continuously variable transmission is well-known, as disclosed in the above-mentioned Japanese Patent Application Laid-Open No. 11-141637. Further, a toroidal type continuously variable transmission of so-called double cavity type in which two input discs and two output discs are disposed side by side in a power transmitting direction to increase a power to be transmitted is also well-known, for example, as disclosed in Japanese Patent Applications Laid-Open Nos. 1-229158 (1989) and 4-69439 (1992).

Since the more concrete construction of such a toroidal type continuously variable transmission is well-known and does not directly relate to the gist of the present invention, explanation thereof will be omitted. However, in any case, configurations and features (surface roughness) of the inner surfaces 2a, 4a of the input and output discs 2, 4 must be formed correctly as desired. The reason is that the inner surfaces 2a, 4a must transmit great torque while abutting against the peripheral surfaces 8a of the power rollers 8 and the contacting conditions between the surfaces 2a, 4a and 8a are rolling contact including slip due to spin.

Accordingly, in order to extend a service life of the surfaces 2a, 4a, 8a against rolling fatigue and to allow great torque to be transmitted, the contact portions of the surfaces 2a, 4a, 8a must have traction oil films each having a proper thickness. The accuracy of configurations of the inner surfaces 2a, 4a are required for optimizing the contacting conditions between the surfaces 2a, 4a and 8a, and the regulation of surface roughness of the surfaces 2a, 4a, 8a to the desired value is required for optimizing the thickness of the traction oil films.

To this end, conventionally, there has been proposed a finishing operation in which the inner surfaces 2a, 4a of the input and output discs 2, 4 are polished by a grindstone having a desired feature (surface roughness) to finish the configurations and features (surface roughness) of the inner surface 2a, 4a as desired. The grindstone which can be used in such a finishing operation is disclosed, for example, in Japanese Patent Application Laid-Open No. 8-252770 (1996). FIGS. 7 and 8 show a grindstone 15 and a method for effecting a finishing operation on an inner surface 16a of a disc 16 used as an input disc or an output disc of a toroidal type continuously variable transmission by using this grindstone 15, disclosed in the above patent gazette.

A working surface 17 of the grindstone 15 is an arc surface having a sectional configuration corresponding to a sectional configuration of the inner surface 16a. When the inner surface 16a is polished by such a grindstone 15, the disc 16 is rotated around a center axis shown by the dot and chain line a in FIG. 8 while urging the working surface 17 against the inner surface 16a. In this case, a shoe is slidingly contacted with a portion of a cylindrical surface 18 formed in outer periphery of the disc 16 at a position opposed to the grindstone 15 in a radial direction, thereby preventing radial displacement of the disc 16 (out-of-center during the working) in opposition to the urging force of the grindstone 15.

In case of the above-mentioned conventional method for working the disc for the toroidal type continuously variable transmission, the cylindrical surface 18 formed in the outer periphery of the disc 16 must be worked with high accuracy. The reason is that, if a center axis of the cylindrical surface 18 does not coincide with a center axis of the inner surface 16a, the configuration of the inner surface 16a cannot be formed as desired. On the other hand, in an assembled condition of the toroidal type continuously variable transmission, since the cylindrical surface 18 does not contact with any other member, in a viewpoint of maintenance of performance of the toroidal type continuously variable transmission itself, it is not required that the working accuracy of the cylindrical surface 18 be higher. Accordingly, in order to reduce the manufacturing cost of the toroidal type continuously variable transmission, it is desirable to provide a method for effecting the working operation for the inner surface 16a with high accuracy without maintaining high accuracy of the cylindrical surface 18.

Further, since the shoe is slidingly contacted with the cylindrical surface 18, if a working speed (rotational speed of the disc 16) is increased, seizure will occur in the slidingly contacting portion and the sliding trace of the shoe will be generated. For this reason, the working speed cannot be increased, with the result that the working time is lengthened, thereby increasing the manufacturing cost.

Further, depending upon the structure of the disc having the inner surface to be subjected to the finishing operation, it may be difficult to perform the above-mentioned method for working the disc for the toroidal type continuously variable transmission. For example, the above-mentioned Japanese Patent Laid-Open No. 11-141637 discloses, as shown in FIG. 9, a technique in which an output gear 19 is directly formed on an outer periphery of an output disc 4A of a toroidal type continuously variable transmission of double cavity type. In such a design, the shoe cannot be engaged with the outer periphery of the output disc 4A. Thus, in order to work or form such an output disc 4A, the output gear 19 must be formed on the outer periphery of the output disc 4A after both axial surfaces of the output disc 4A were finished. Such a working operation is not desirable because of not only increased cost but also possibility of damaging the already finished both surfaces of the output disc during the formation of the output gear 19.

SUMMARY OF THE INVENTION

In consideration of the above-mentioned conventional drawbacks, the present invention provides a disc for a toroidal type continuously variable transmission and a method for working such a disc.

The present invention relates to a disc as an input disc or an output disc for a toroidal type continuously variable transmission which comprises an input disc having an outer peripheral surface defined by a cylindrical surface and an axial surface constituted by an input concave surface including an arcuate section, an output disc having an outer peripheral surface constituted by a cylindrical surface and at least one axial surface, which is opposed to the input concave surface and defined by an output concave surface including an arcuate section, a plurality of trunnions disposed at twisted positions with respect to the input and output discs between portions of the input and output discs and rockable between said portions, and a plurality of power rollers each having a convex peripheral surface defined by a rotating arc surface and pinched between the input concave surface and the output concave surface in a condition that the power rollers are rotatably supported by the trunnions, and in which torque is transmitted from the input disc to the output disc via the plurality of power rollers, and a method for working such a disc.

Particularly, according to a first aspect of the present invention, an outer peripheral surface of the disc for toroidal type continuously variable transmission is not ground.

Further, according to a second aspect of the present invention, in the method for working the disc for the toroidal type continuously variable transmission, the axial surface of the disc as the input disc or the output disc for the toroidal type continuously variable transmission is worked to a desired configuration and feature by super finish working.

In such a method for working the disc for the toroidal type continuously variable transmission according to the second aspect, by urging a shoe against a portion of circumference of the axial surface of the disc, the disc for the toroidal type continuously variable transmission is supported for rotation around its center axis, and the disc for the toroidal type continuously variable transmission is rotated in a condition that a super finish working grindstone is urged against a portion circumferentially deviated from the portion of the axial surface urged by the shoe.

According to the disc for the toroidal type continuously variable transmission and the method for working such a disc of the present invention having the above-mentioned construction, the axial surface of the disc as the input disc or the output disc for the toroidal type continuously variable transmission can be finished with high accuracy without particularly increasing accuracy of the outer peripheral surface of the disc for the toroidal type continuously variable transmission. Further, even after a gear and the like is formed on the outer peripheral surface of the disc for the toroidal type continuously variable transmission, the axial surface can be finished. Thus, the cost of the toroidal type continuously variable transmission including the input disc and the output disc can be reduced.

DESCRIPTION OF THE PREFERRED EMBODIMENTS

Figure 1:
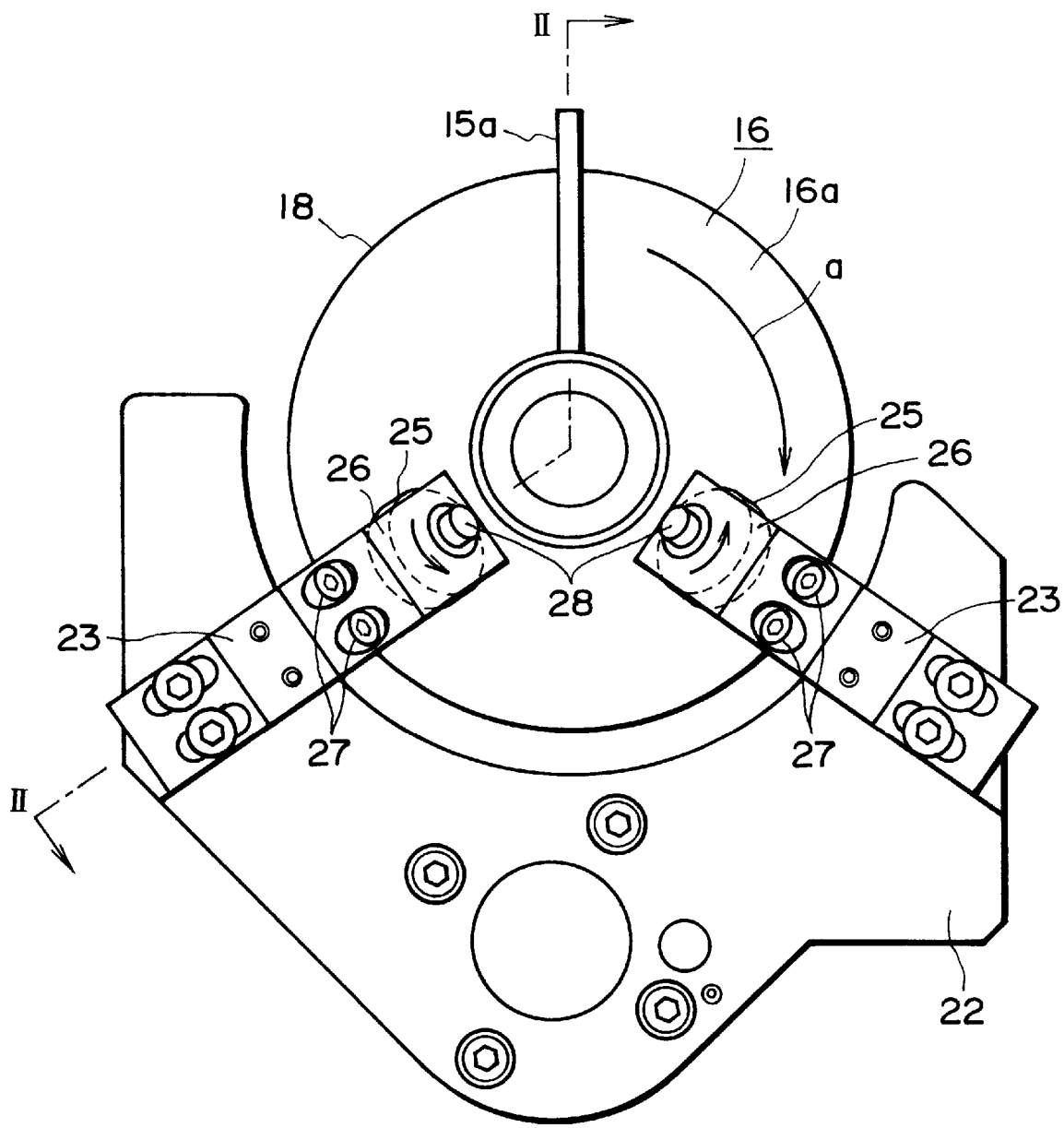
FIG. 1 is a view showing a first example of an embodiment of the present invention, looked at from an input surface side of a disc in an axial direction.
Figure 2:
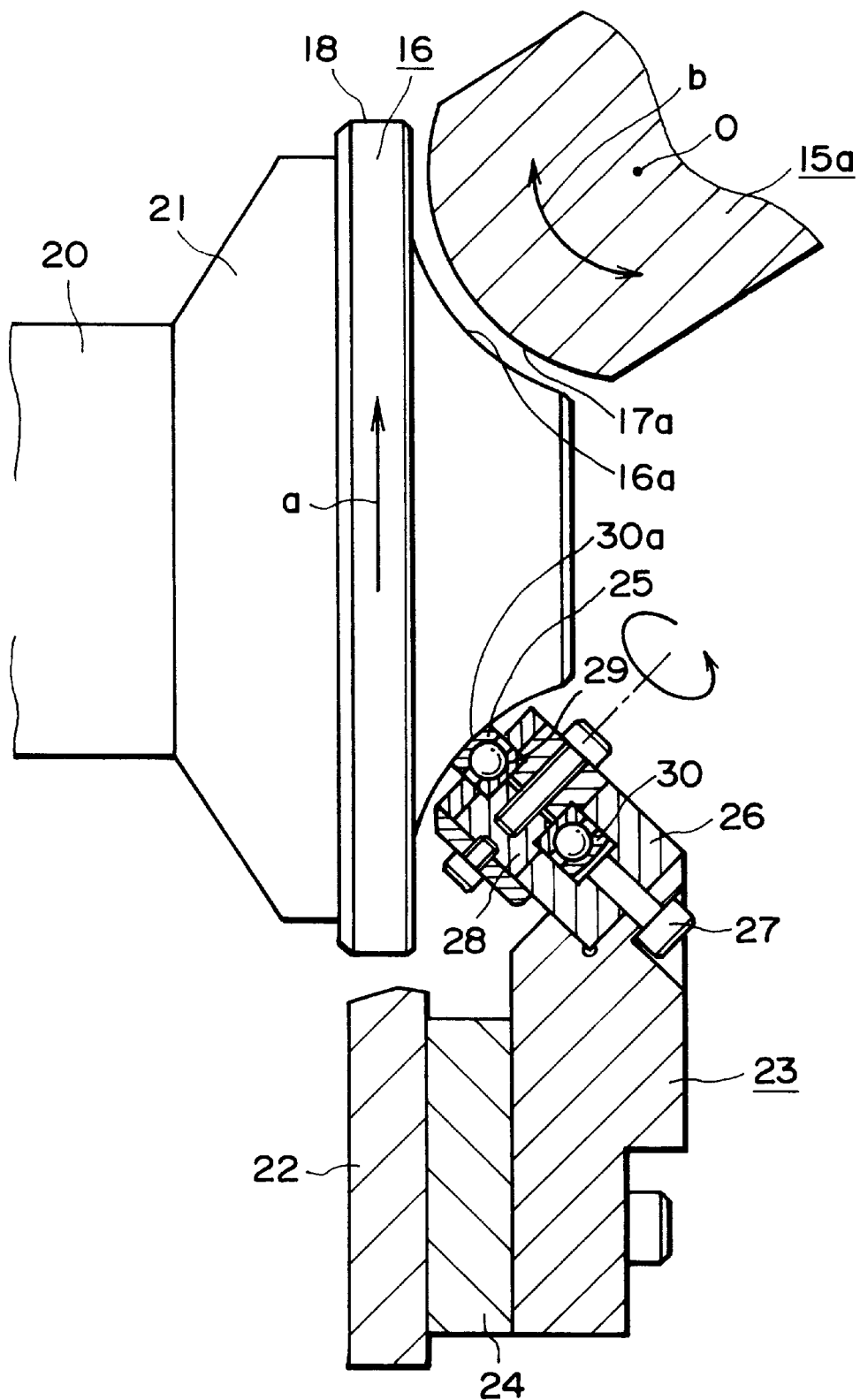
FIG. 2 is a sectional view taken along the line II—II in FIG. 1.

FIGS. 1 and 2 show an example of an embodiment of the present invention. Incidentally, since structure and function of a toroidal type continuously variable transmission including a disc 16 having an inner surface 16a as an axial surface finished by the working method according to the present invention are similar to those of the conventional toroidal type continuously variable transmission, explanation thereof will be omitted, and finish working of the inner surface 16a will be explained.

The disc 16 is supported on and along a front surface (right surface in FIG. 2) of a packing plate 21 secured to a tip end portion of a rotary shaft 20 and rotated together with this shaft 20. Accordingly, although the disc 16 is rotated together with the packing plate 21, if a radial force is applied to the disc, the disc is displaced radially with respect to the packing plate 21.

Below the disc 16 supported in this way, a support plate 22 is fixedly supported by a frame (not shown) of a working machine in a condition that a lower peripheral portion of the disc 16 is surrounded. Two support arms 23 are fixedly supported on one surface (right surface in FIG. 2) of the support plate 22 via spacers 24 at two positions slightly deviated laterally from a lower end of the disc 16 in a radial direction of the disc 16. Roller shoes 25 are supported on distal ends of the arms 23. Specifically, a proximal end of a bifurcated holder 26 is secured to the distal end of each arm 23 by screws 27, and a roller shoe 25 is rotatably supported on a support shaft 28 held at a distal end of the holder 26.

The roller shoe 25 has a structure similar to that of a general single deep groove ball bearing except for a configuration of an outer peripheral surface 30a of an outer race 30 which will be described later, and an inner race 29 is fixedly fitted on the support shaft 28 and the outer peripheral surface 30a of the outer race 30 is rollingly contacted with the inner surface 16a of the disc 16. Thus, a radius of curvature of a sectional configuration of the outer peripheral surface 30a is made equal to or slightly smaller than a radius of curvature of a sectional configuration of the inner surface 16a so that excessive surface pressure due to edge load and the like does not act on a contact portion between the outer peripheral surface 30a and the inner surface 16a. Further, if necessary, a coating layer made of TiN, TiCN or the like is formed on the outer peripheral surface 30a to suppress attack to the inner surface 16a thereby to prevent damage of the inner surface 16a and also prevent wear of the outer peripheral surface 30a. The outer peripheral surfaces 30a of the outer races 30 of the pair of roller shoes 25 are rollingly contacted with two portions of the inner surface 16a of the disc 16 near the lower end thereof so that the disc 16 is prevented from displacing downwardly from an illustrated condition.

On the other hand, a working surface 17a of a grindstone 15a can be urged against an upper end position of the inner surface 16a of the disc 16. A sectional configuration of the working surface 17a is defined by an arc rotated around a center axis passing through a point 0 in FIG. 2. Such a grindstone 15a is supported by a supporting device (not shown) for rocking movement around the point 0.

When the inner surface 16a of the disc 16 is finish-worked, the disc 16 is rotated in a direction shown by the arrow a in FIGS. 1 and 2 via the packing plate 21 by rotating the rotary shaft 20. At the same time, the grindstone 15a is reciprocally rocked in directions shown by the double headed arrow b in FIG. 2 while urging the working surface 17a of the grindstone 15a against the inner surface 16a of the disc 16. As a result, the inner surface is finish-worked with super finish.

When such finish-working is effected, due to an urging force applied from the grindstone 15a to the inner surface 16a, although the disc 16 tends to be displaced downwardly in FIGS. 1 and 2, such an urging force is supported by the pair of roller shoes 25. Since the grindstone 15a is disposed at a position diametrically opposed to a middle position between the pair of roller shoes 25, the urging force can be supported by the roller shoes effectively. Accordingly, the disc 16 is not displaced downwardly, with the result that the inner surface 16a can be worked with high accuracy.

Further, the urging force applied from the grindstone 15a to the inner surface 16a has a force component for urging the disc 16 against the front surface of the packing plate 21. Accordingly, during the working operation, the disc 16 is rotated together with the packing plate 21 while being urged against the front surface of the packing plate 21. Accordingly, there is no need for providing a pressure plate and the like for urging the disc 16 against the packing plate 21. Thus, not only the construction of the finish-working device can be simplified, but also the disc 16 can easily be mounted to and dismounted from the finish-working device, thereby reducing the manufacturing cost.

Furthermore, since the outer peripheral surfaces 30a of the outer races 30 of the roller shoes 25 are rollingly contacted with the inner surface with sufficient areas, even if the rotational speeds of the shoes 25 are increased, the contact portions between the surfaces 30a and 16a are not subjected to seizure and the sliding traces are not generated. Accordingly, since the working speed can be increased, the finish-working efficiency for the inner surface 16a can be enhanced, thereby reducing the manufacturing cost.

Figure 3:
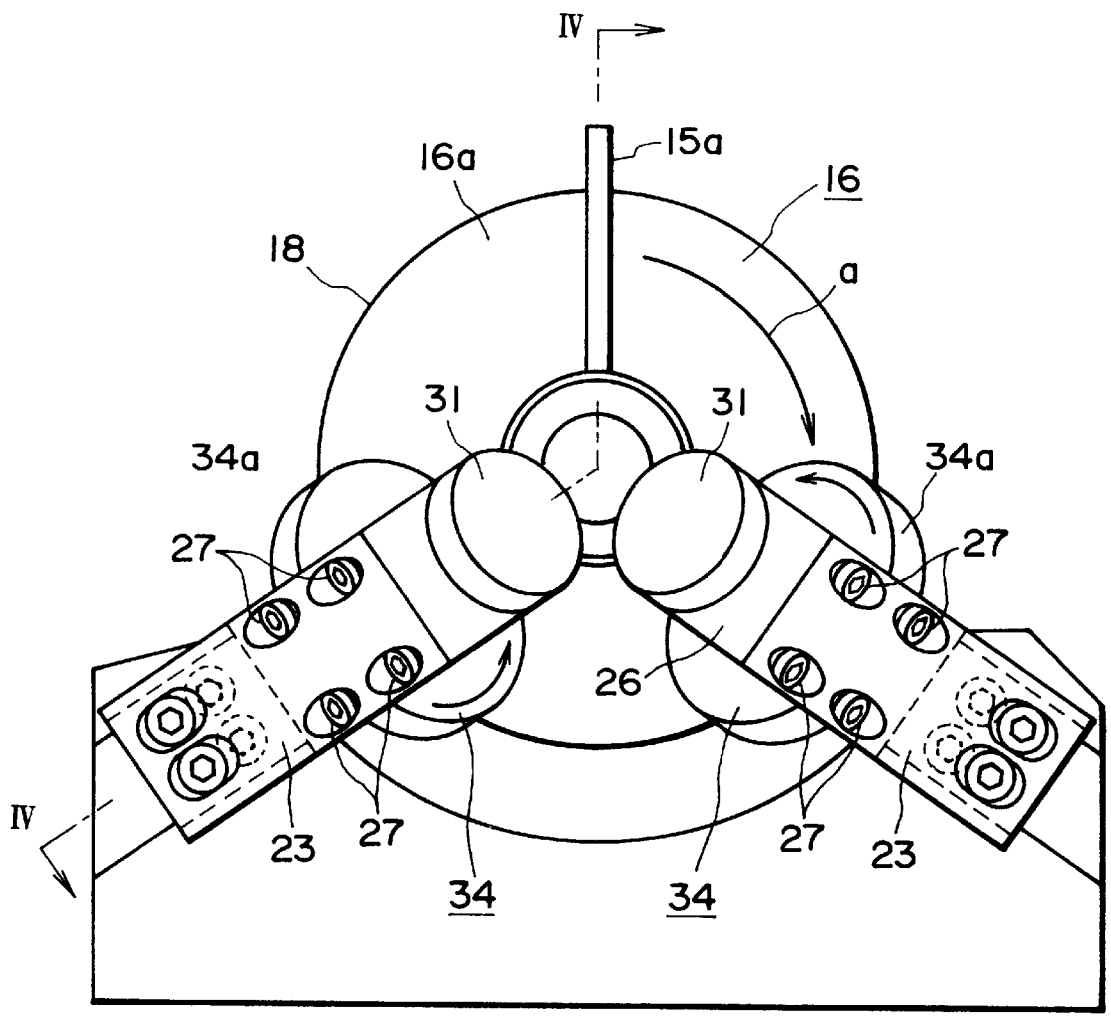
FIG. 3 is a view showing a second example of an embodiment of the present invention, looked at from an input surface side of a disc in an axial direction.
Figure 4:
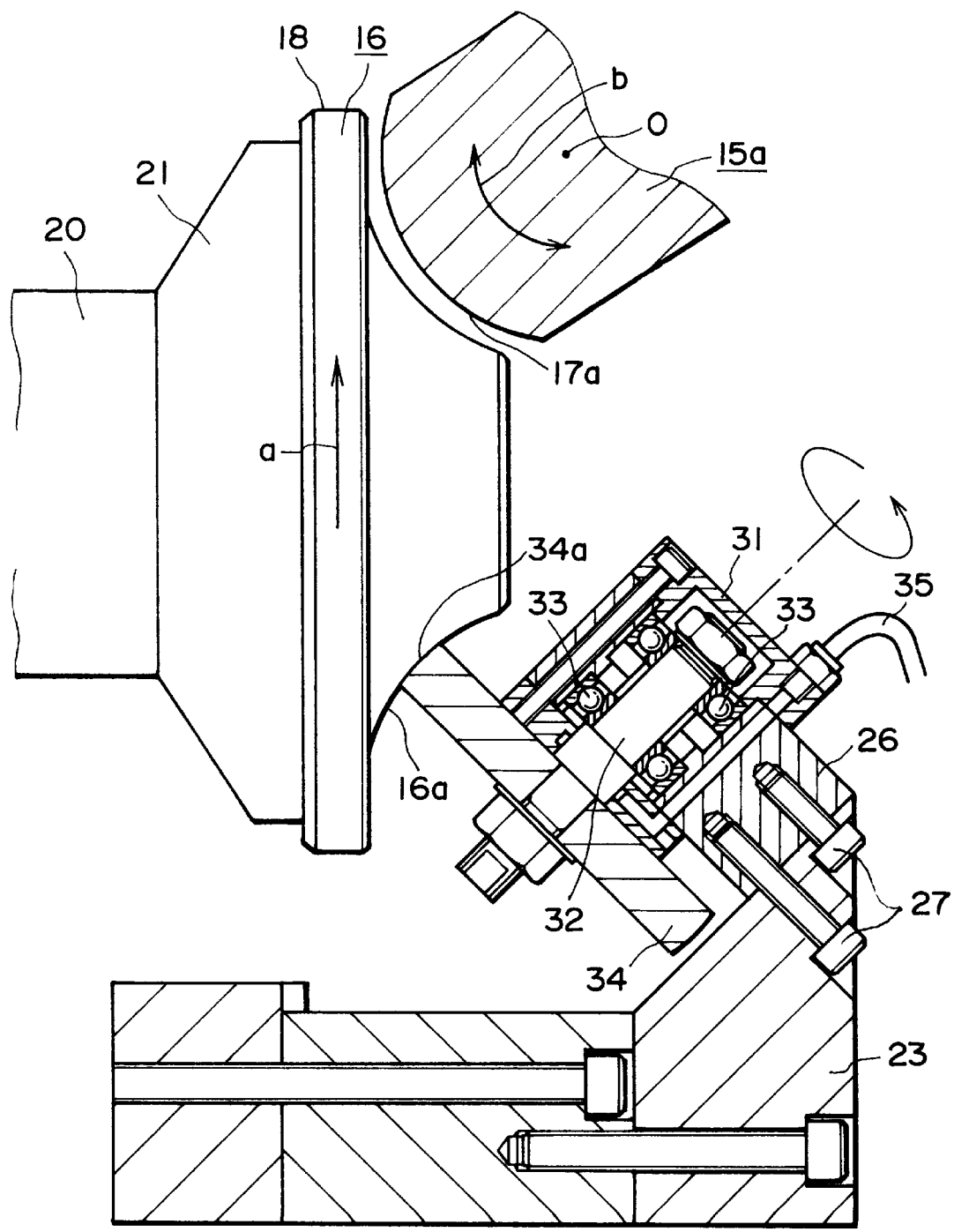
FIG. 4 is a sectional view taken along the line. IV—IV in FIG. 3.
Figure 5:
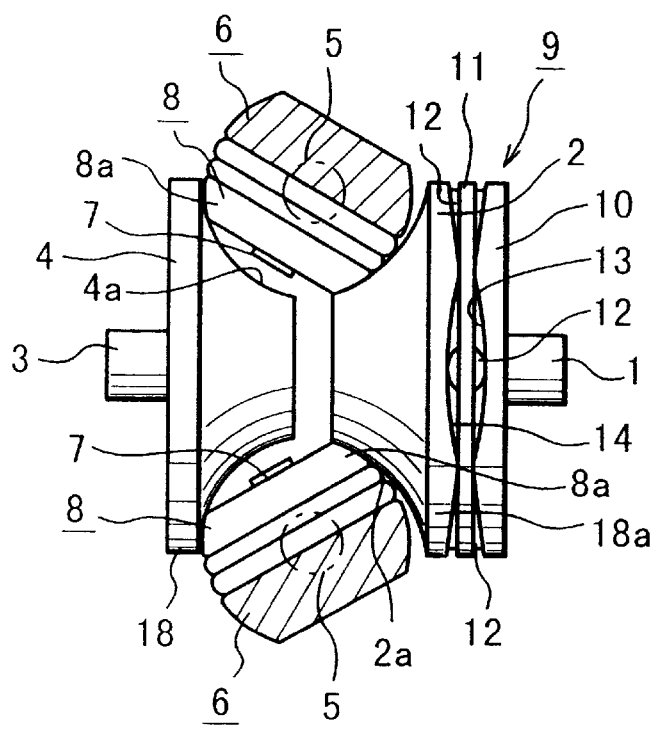
FIG. 5 is a schematic side view showing a fundamental construction of a toroidal type continuously variable transmission in a maximum speed reduction condition.
Figure 6:
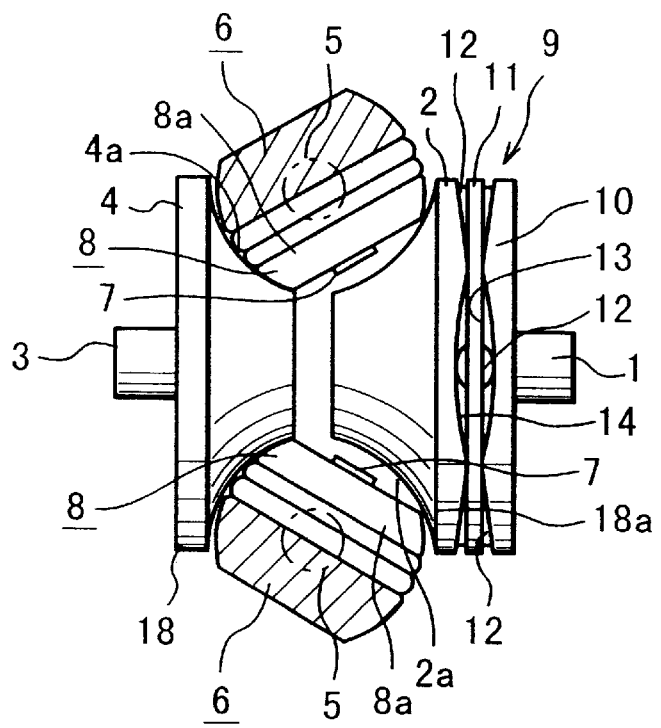
FIG. 6 is a schematic side view showing the fundamental construction of the toroidal type continuously variable transmission in a maximum speed increase condition.
Figure 7:
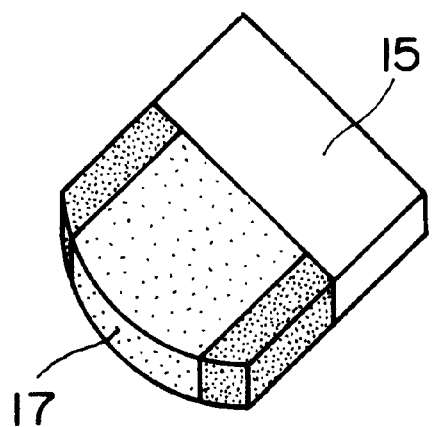
FIG. 7 is a perspective view showing an example of a grindstone known in the prior art.
Figure 8:
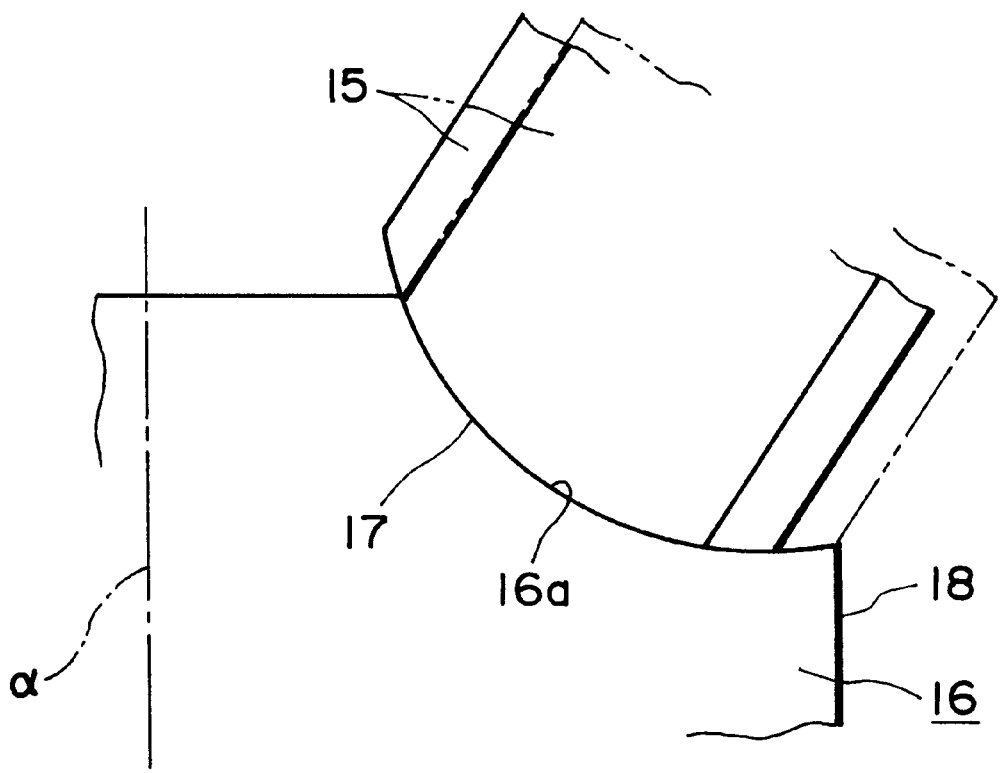
FIG. 8 is a partial side view showing a condition that an inner surface of a disc is ground by the grindstone.
Figure 9:
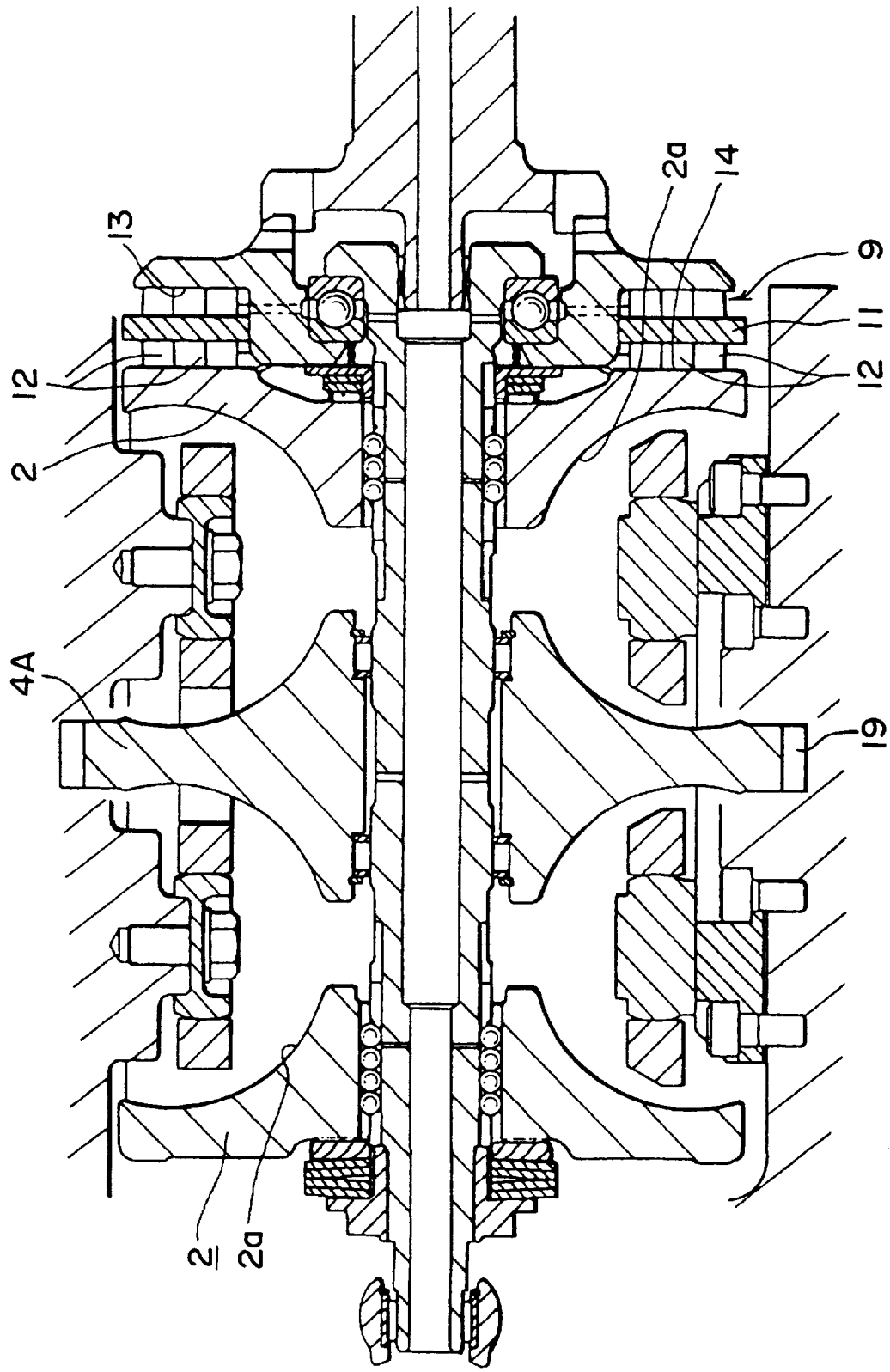
FIG. 9 is a sectional view showing an example of a toroidal type continuously variable transmission including an output disc which is hard to be worked by conventional methods.

FIGS. 3 and 4 show a second example of the embodiment of the present invention. In this example, proximal half portions of support shafts 32 are rotatably supported by a pair of rolling bearings 33 within bearing boxes 31 secured to distal ends of a pair of arms 23. Disc-shaped roller shoes 34 are secured to distal ends of the support shafts 32 so that outer peripheral surfaces 34a of the roller shoes 34 are rollingly contacted with the inner surface 16a of the disc 16. Further, oil air (compressed air including atomized lubricating oil) is supplied into the bearing boxes 31 through hoses 35. The oil air serves to lubricate the rolling bearings 33 and generate positive pressure within the bearing boxes 31 so that working liquid supplied to the contact portion between the working surface 17a of the grindstone 15a and the inner surface 16a of the disc 16 is prevented from entering into the bearing boxes 31. And, the service lives of the rolling bearings 33 are extended.

Since constructions and functions of the other elements, including the fact that the sectional configurations of the outer peripheral surfaces 34a of the roller shoes 34 are defined by arcs, are the same as those in the above-mentioned first example, the same elements are designated by the same reference numerals and explanation thereof will be omitted.

Although the present invention is constructed and functioned as mentioned above, since it is not required that outer peripheral surface of the disc be not worked with high accuracy, the manufacturing cost can be reduced. Further, even if the outer peripheral edge of the disc is not true circle, since the side surface of the disc can be worked, the cost of the disc can particularly be reduced.

What is claimed is:

1. A method for working, to a desired configuration and feature by super finish working, an axial surface of a disc as an input disc or an output disc for a toroidal type continuously variable transmission which comprises an input disc having an outer peripheral surface defined by a cylindrical surface and an axial surface constituted by an input concave surface including an arcuate section, an output disc having an outer peripheral surface constituted by a cylindrical surface and at least one axial surface, which is opposed to said input concave surface and defined by an output concave surface including an arcuate section, a plurality of trunnions disposed at twisted positions with respect to said input and output discs between portions of said input and output discs and rockable between said portions, and a plurality of power rollers each having a convex peripheral surface defined by a rotating arc surface and pinched between said input concave surface and said output concave surface in a condition that said power rollers are rotatably supported by said trunnions, and in which torque is transmitted from said input disc to said output disc via said plurality of power rollers, wherein:

by urging a shoe against a portion of circumference of said axial surface of said disc, said disc for the toroidal type continuously variable transmission is supported for rotation around its center axis, and said disc for the toroidal type continuously variable transmission is rotated in a condition that a super finish working grindstone is urged against a portion circumferentially deviated from said portion of the axial surface urged by said shoe.

2. A method for working a disc for a toroidal type continuously variable transmission according to claim 1, wherein a roller shoe rotated around a support shaft is used as said shoe, and an outer peripheral surface of said roller shoe is rollingly contacted with an inner surface of said disc for the toroidal type continuously variable transmission.

3. A method of working a traction surface of a torodial disc for a torodial continuously variable transmission, said method comprising:

rotating said disc with a super finish working grindstone contacting a first portion of said traction surface; and urging a shoe against a second portion of said traction surface circumferentially deviated from said first portion.

4. A method according to claim 3, wherein said shoe comprises a roller, said roller rollingly engaging said traction surface of said disc.

5. A method according to claim 3, wherein said method further comprises urging an additional shoe against a third portion of said traction surface circumferentially deviated from said first and second portions.

6. A method according to claim 5, wherein said shoe comprises a roller, said roller rollingly engaging said traction surface of said disc.

7. A method according to claim 5, wherein said first portion is disposed substantially at a mid-position between said second and third portions circumferentially of said traction surface.

8. A method according to claim 3, further comprising rocking said grindstone during the rotation of said disc.

* * * * *